Dec. 12, 1967  H. NERWIN  3,357,329
FLASH EJECTOR
Filed July 14, 1965  2 Sheets-Sheet 1

HUBERT NERWIN
INVENTOR.

BY R. Frank Smith
Ronald S. Cowles

ATTORNEYS

United States Patent Office 3,357,329
Patented Dec. 12, 1967

3,357,329
FLASH EJECTOR
Hubert Nerwin, Rochester, N.Y., assignor to Eastman Kodak Company, Rochester, N.Y., a corporation of New Jersey
Filed July 14, 1965, Ser. No. 471,820
3 Claims. (Cl. 95—11)

The present invention relates to flash photography, and more particularly, to an ejecting mechanism for use in multilamp photoflash devices.

There has been developed a disposable multilamp flash package comprising a connecting base and a plurality of photoflash lamps and individual reflectors, disclosed for example in U.S. applications Ser. Nos. 417,913 and 417,-914, now Patent No. 3,327,105, filed Dec. 14, 1964. There have also been developed photographic cameras and flash devices designed to receive such packages and to automatically index each package to sequentially place the lamps of the package in a photoflash circuit for the taking of one or more flash exposures. One such photographic camera is disclosed in U.S. application Ser. No. 458,016, filed May 24, 1965. In that application, there is disclosed a connecting socket forming part of the camera, to which the connecting base of a multilamp package is attached, and means to rotate the connecting socket and attached package with film wind to sequentially place the lamps in a flash synchronizing circuit of the camera by engagement of the lead-in wires of the lamps with a pair of fixed circuit terminals.

As an improvement for such cameras and devices, the present invention provides a means for automatically ejecting a connected flash package after all of the lamps of the package have been used. A suitable mechanism according to my invention comprises an ejector urged to an ejecting position, the ejector being responsive to insertion of a package to be rotatable with the socket and package and then operative to automatically eject the attached package after all of the flash lamps have been fired.

An important object of my invention resides, therefore, in the provision of an ejector mechanism which automatically ejects a multilamp package from the connecting socket of a flash device after all of the lamps have been fired.

A further object of the invention resides in the provision of a simple ejection system responsive to attachment of a lamp package to actuate a control mechanism which prevents ejection until all of the lamps of the package have been used, and then to indicate complete use of the package by automatically ejecting the package.

These and other objects and advantages of my invention which will become more apparent in the course of the following description of a preferred embodiment, the accompanying drawing forming a part thereof and wherein.

Figure 1:
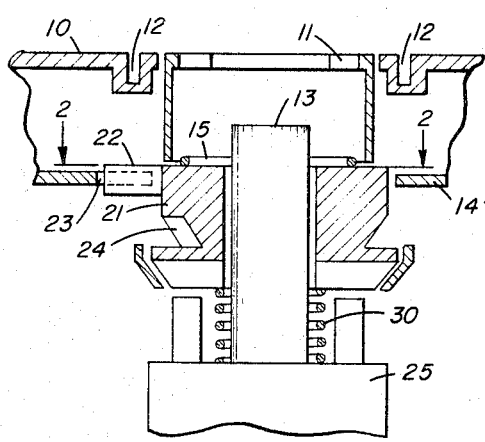
FIG. 1 is a front sectional view of a preferred embodiment of the invention.
Figure 3:
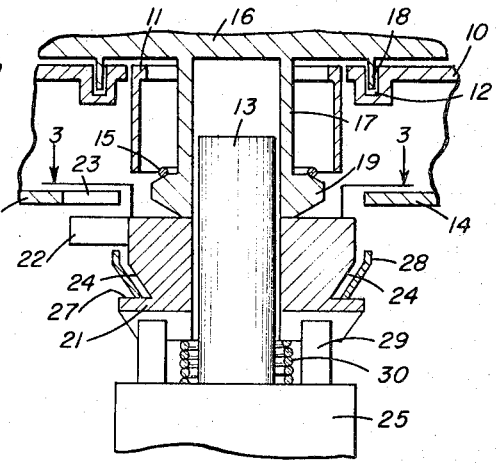
FIG. 3 is a front view of the mechanism of FIG. 1 showing a lamp package attached.
Figure 2:
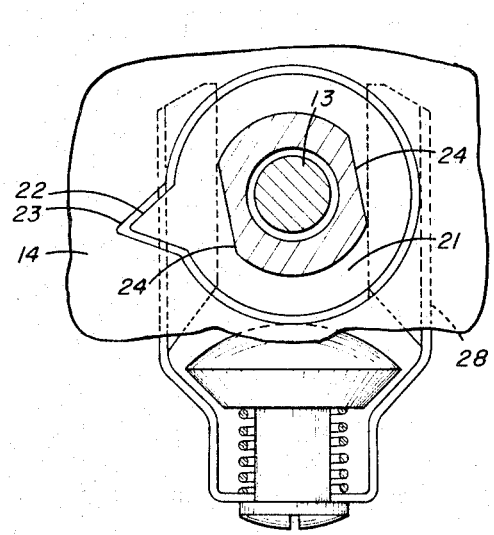
FIG. 2 is a top view of the mechanism shown in FIG. 1, taken in section on line 2—2 of FIG. 1.

Referring to FIGS. 1 and 2, there is shown a cross section of a top wall 10 of a flash device, suitably a photographic camera housing, at which is located a rotatable connecting socket 11 for receiving the attaching base of a multilamp flash package. Top wall 10 defines an annular contact recess 12, and disposed below the access opening of the socket 11 is a stabilizing stud 13 which passes through an opening in a fixed plate 14 in the interior of the camera body. Referring also to FIGURE 3, a multilamp photoflash package as described in the above application includes an attaching base 16 having a depending, cylindrical connecting post 17 insertable into the socket access opening. The post 17 fits over stud 13, and retaining lugs 19 on the post 17 are engageable with a retaining spring 15 in the socket, the ends of which are biased inwardly to detachably retain the package on the socket 11 for rotation therewith. The annular contact ring 18 which is coaxial with the connecting post 17 is positioned in the receiving recess 12 for sequential engagement of the respective pairs of lead-in wires of each lamp of the package with fixed terminals of a photoflash circuit disposed in the recess 12. The engagement of all of the lamps to sequentially fire these lamps is accomplished by rotation through a predetermined cycle of revolution.

According to my invention, there is provided an ejector ring 21 rotatably supported on the stud 13. Ejector ring 21 includes a single key portion 22 which cooperates with a keyway or notch 23 formed in the plate 14. On the periphery of ring 21 below key 22 is a section defining a pair of opposing flats 24 and an annular spring engagement surface 27 engageable by a pair of opposing spring legs 28 of a scissors-type spring.

Rotation of the socket and attached multilamp flash package with film wind, for example, may be accomplished in the manner described in the above application Serial No. 458,016 by a selectively rotatable driving member 25 which is integral with stabilizing stud 13 to transfer rotational motion to socket 11 through stud 13 to socket 11 and the attached package fixed thereto. Ejector ring 21 is normally urged upwardly by a strong helical ejector spring 30 to the ejection position shown in FIGS. 1 and 2, in which key 22 is in keyway notch 23 in the plane of plate 14, thereby preventing rotation of ring 21.

Figure 4:
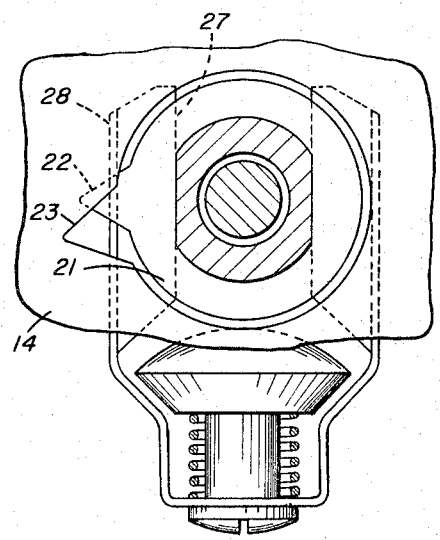
FIG. 4 is a top view of FIG. 3 taken in section on line 4—4 of FIG. 3.

Upon the insertion of a package base 16 into socket 11, the lower edge of connecting post 17 engages the top surface of ring 21 to push ring 21 downwardly against the bias of spring 30 until a keyway means on the lower section of ring 21 engages a driving clutch type key 29 on the drive member 25, as shown in FIG. 3. During the downward movement of ring 21, key 22 in like manner moves to a position below plate 14. The opposing spring legs 28, which are biased inwardly, engage flats 24 to cause ring 21 to rotate a small amount clockwise to the position shown in FIG. 4, in which the key 22 is no longer in alignment with notch 23, and ring 21 is prevented from moving back up to the position of FIG. 1 by engagement of spring legs 28 on the surfaces 27.

After attachment of a package in the manner described, the indexing mechanism camera may then be operated for flash exposures by which the driving part 25 rotates the socket 11 and attached package. Simultaneously, ejector ring 21 is rotated by driving key 29 with the drive member 25 and socket 11 through the revolution cycle. In the case of four flash lamps in a package as described in the above applications, the ring 21 and socket 11 each rotate a quarter turn during each indexing operation through the revolution cycle when all of the lamps have been fired.

Figure 5:
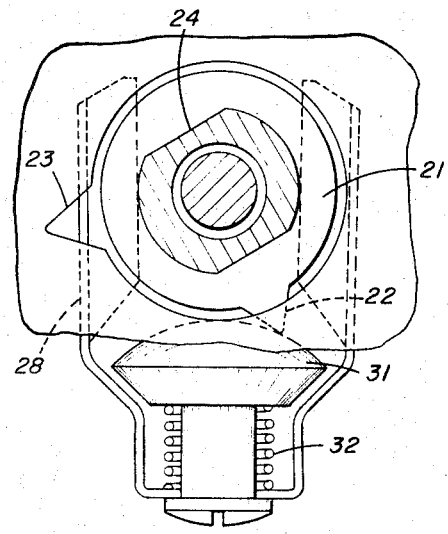
FIGS. 5 through 7 are further views showing various stages of operation of the invention.
Figure 6:
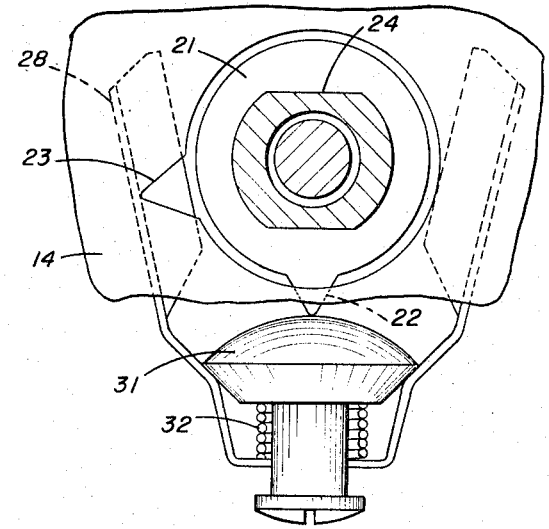
Figure 7:
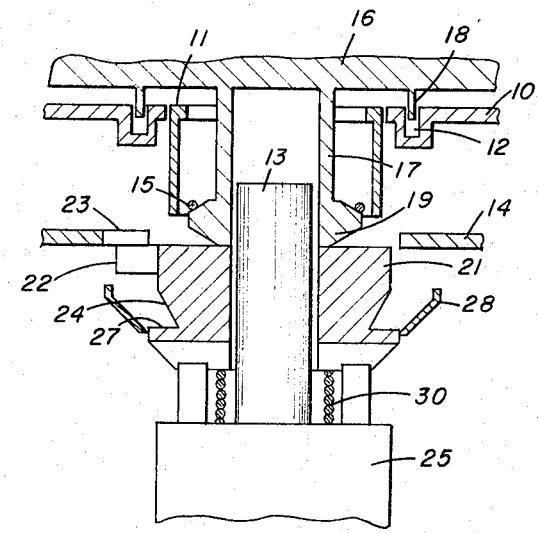

Referring now to FIG. 5, it may be seen that spring legs 28 are controlled by a release plunger 31 biased toward ejector ring 21 by a helical compression spring 32. Plunger 31 is engaged by key 22 as key 22 rotates with ring 21 to the position shown in FIG. 6, in which plunger 31 is thereby moved by key 22 against bias of spring 32 to spread spring legs 28 outwardly from engagement with the spring engaging surfaces 27 of ring 21. In this position, ejector spring 30 tends to urge ring 21 upwardly to its ejection position, but is prevented because ring 21 is held downwardly for rotation with socket 11 by engagement of key 22 with the lower surface of plate 14. Upon complete rotation through the revolution cycle at which time there has been complete use of the lamp package, key 22 again is moved into alignment with keyway notch 23. At this instance ejector ring 21 is permitted to move back upwardly to its ejection position shown in FIG. 1. Since spring 30 is stronger than retaining spring 15, the attached lamp package is simultaneously ejected by pushing the lamp base connecting post 17 upwardly out of socket 11.

While my invention has been described in relation to a preferred embodiment, it is obvious that variations can be resorted to without departing from the spirit of my invention or the scope of the subjoined claims.

I claim:

1. In a flash device having a connecting socket to attach a photoflash package containing a plurality of photoflash lamps, and drive means to rotate the attached package through a revolution cycle to sequentially place the lamps in a photoflash circuit for flashing with sequential operations of a camera, the improvement comprising ejector means responsive to attachment of a package to rotate with the attached package, means urging the ejector means toward an ejecting position, retainer means overcoming the urging means to hold the ejector means during rotation of the attached package through the revolution cycle, and means upon completion of the revolution cycle to release the retainer means and eject the attached package by movement of the ejector means toward its ejecting position.

2. The improvement according to claim 1 wherein the ejector means comprises a rotatable ring having a key and the retainer means includes a pair of opposing spring legs engageable with the ring upon attachment of the package, and further comprising plunger means engaged by the key during the revolution cylce to urge the spring legs out of engagement with the ring.

3. In a flash device having a connecting socket to attach a photoflash package containing a plurality of photoflash lamps, and drive means to rotate the attached package through a revolution cycle to sequentially place the lamps in a lamp firing position for flashing with sequential operations of a camera, the improvement comprising ejector means responsive to attachment of a package to rotate with the attached package, means urging the ejector means toward an ejecting position, retainer means overcoming the urging means to hold the ejector means during rotation of the attached package through the revolution cycle, and means upon completion of the revolution cycle to release the retainer means and eject the attached package by movement of the ejector means toward its ejecting position.

References Cited
UNITED STATES PATENTS

| | | | |
|---|---|---|---|
| 3,096,025 | 7/1963 | Prochnow | 240—1.3 |
| 3,319,547 | 5/1967 | Parsons et al. | 95—11 |
| 3,319,548 | 5/1967 | Kottler | 95—11 |

NORTON ANSHER, *Primary Examiner.*

F. L. BRAUN, *Assistant Examiner.*